United States Patent
Wang

Patent No.: US 6,342,003 B1
Date of Patent: Jan. 29, 2002

(54) AUTOMOBILE AIR-CONDITIONING OUTLET DEFLECTION DEVICE

(76) Inventor: Pomin Wang, P.O. Box 697, Feng-Yuan City 420 (TW)

(*) Notice: Subject to any disclaimer, the term of this patent is extended or adjusted under 35 U.S.C. 154(b) by 0 days.

(21) Appl. No.: 09/927,200

(22) Filed: Aug. 8, 2001

(51) Int. Cl.[7] .................................................. B60H 3/02
(52) U.S. Cl. ........................ 454/155; 454/155; 454/110; 422/122
(58) Field of Search ................................ 454/155, 154, 454/153, 152, 278, 337, 328, 143, 157; 422/122, 124

(56) References Cited

U.S. PATENT DOCUMENTS

| | | | |
|---|---|---|---|
| 4,654,198 A | * | 3/1987 | Berardini ..................... 422/124 |
| 5,932,147 A | * | 8/1999 | Chen ............................ 261/30 |
| 6,102,660 A | * | 8/2000 | Lee ........................... 416/146 R |

* cited by examiner

Primary Examiner—Pamela Wilson
Assistant Examiner—Derek S. Boles

(57) ABSTRACT

The present invention of an automobile air-conditioning outlet deflection device comprising a main body which is in ring shape, a plurality of crossing rods are disposed within said main body, the intersection point of said crossing rods is connected to a set of deflection blades, said set of deflection blades having a plurality of blades disposed within a ring part, a set of spinning blades located at the other side of said main body, said set of spinning blades spins when air-conditioning blow on it, thus move said set of deflection blades to spin also, a set of gears is disposed on an axial rod of said set of spinning blades, said set of gears is connected to an axial rod of said deflection blades, few blades of said set of spinning blades are relatively shorter than the rest, a speed-slowing blade is connected to each of said short spinning blade, said axial rod of said set of spinning blades is connected to a cover body, said cover body having a circumference side and a plurality of crossing rods, accordingly said speed-slowing blades of said set of spinning blades press against the inner surface of said circumference side of said cover body when said set of spinning blades spin very fast, the rubbing effect can maintain a steady and stable spinning speed of said set spinning blades, thus air-conditioning blows at different directions evenly.

6 Claims, 5 Drawing Sheets

AUTOMOBILE AIR-CONDITIONING OUTLET DEFLECTION DEVICE

BACKGROUND OF THE INVENTION

The present invention relates automobile air-conditioning outlet and more particularly to an automobile air-conditioning outlet deflection device. Conventional automobile air-conditioning outlet only exhausts air in one single direction, you have to manually move the defection blades in order to change the direction the air exhausts. This is resulted in bad air circulation and some passengers feel too cold while the others feel too hot. Some air dispensers for automobile are designed as helicopter shape which the blades can make the fragrance to circulate more even, but can not deflect the air to exhaust to different directions.

SUMMARY OF THE PRESENT INVENTION

The present invention of an automobile air-conditioning outlet deflection device comprises a main body which is in ring shape having a set of crossing rods. A set of deflection blades are disposed at the center of the crossing rods. The set of deflection blades are disposed within a ring of the main body, so that air-conditioning blows at different directions according to the spinning movement of the deflection blades. A set of spinning blades are disposed on the other side of the main body. The air-conditioning blow on the spinning blades and the spinning blades move the deflection blades. The deflection blades having a set of gears connected to an axial rod of the spinning blades. Few of the spinning blades are relatively shorter for placing a speed-slowing blade on top. The axial rod of the spinning blades is connected to a cover body, a set of posts are disposed on the circumference of the cover body. The speed-slowing blades are pressed on the inner circumference side of the cover body to control and steady the spinning speed of the spinning blades.

The present invention has a primary objective to provide a compact size automobile air-conditioning outlet deflection device which utilizes air outlet of automobile air-conditioning to cause the device to change position of its blades to allow air to blow at different directions without electricity. Another objective of the present invention is provide a steady deflection speed of the blades of the device despite the air-conditioning blowing intensity in order to obtain stable and steady air circulation within the automobile.

The present invention will become more fully understood by reference to the following detailed description thereof when read in conjunction with the attached drawings.

DETAILED DESCRIPTION OF THE PREFERRED EMBODIMENT

Figure 1:
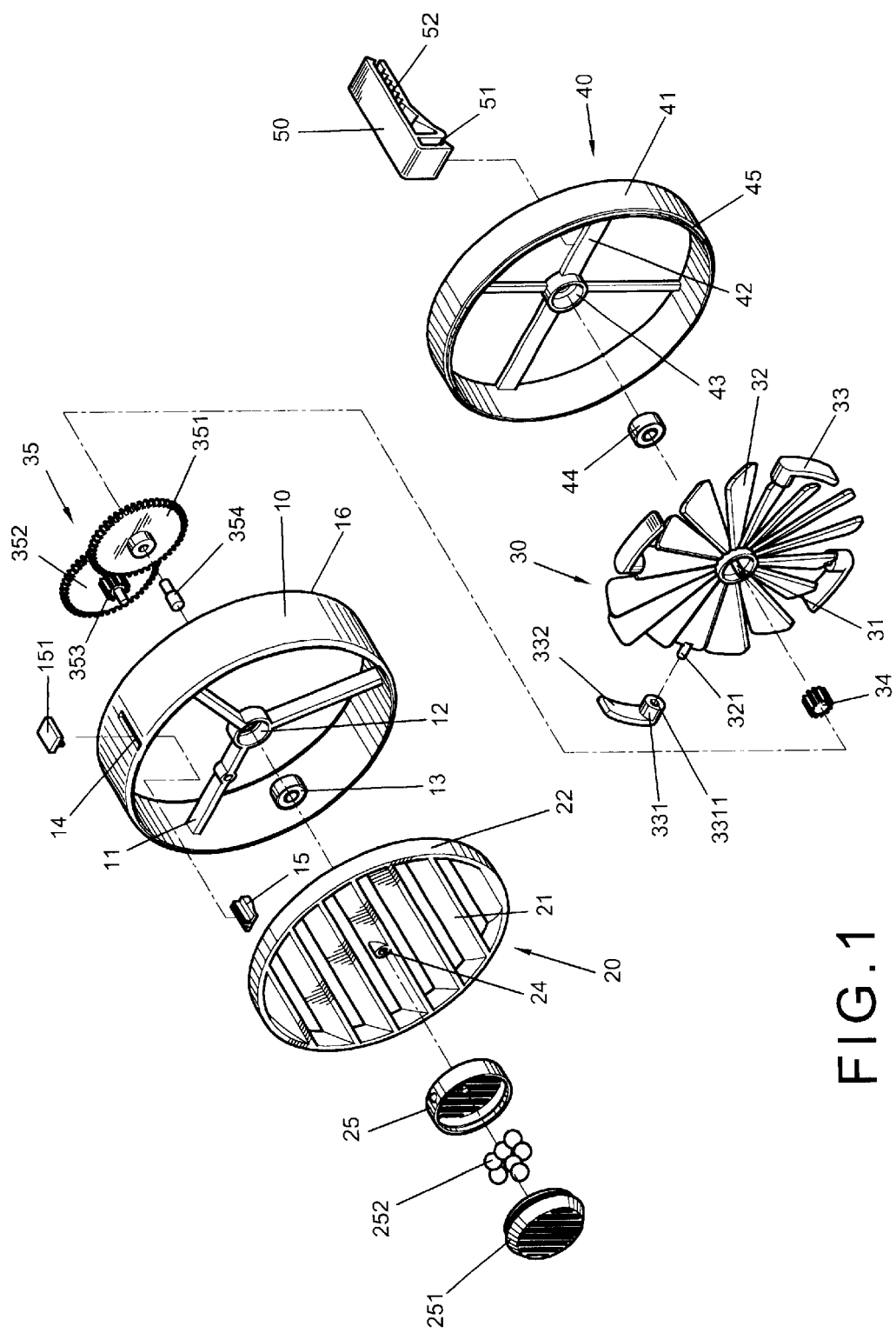
FIG. 1 is an exploded perspective view of the present invention of an automobile air-conditioning outlet deflection device.
Figure 2:
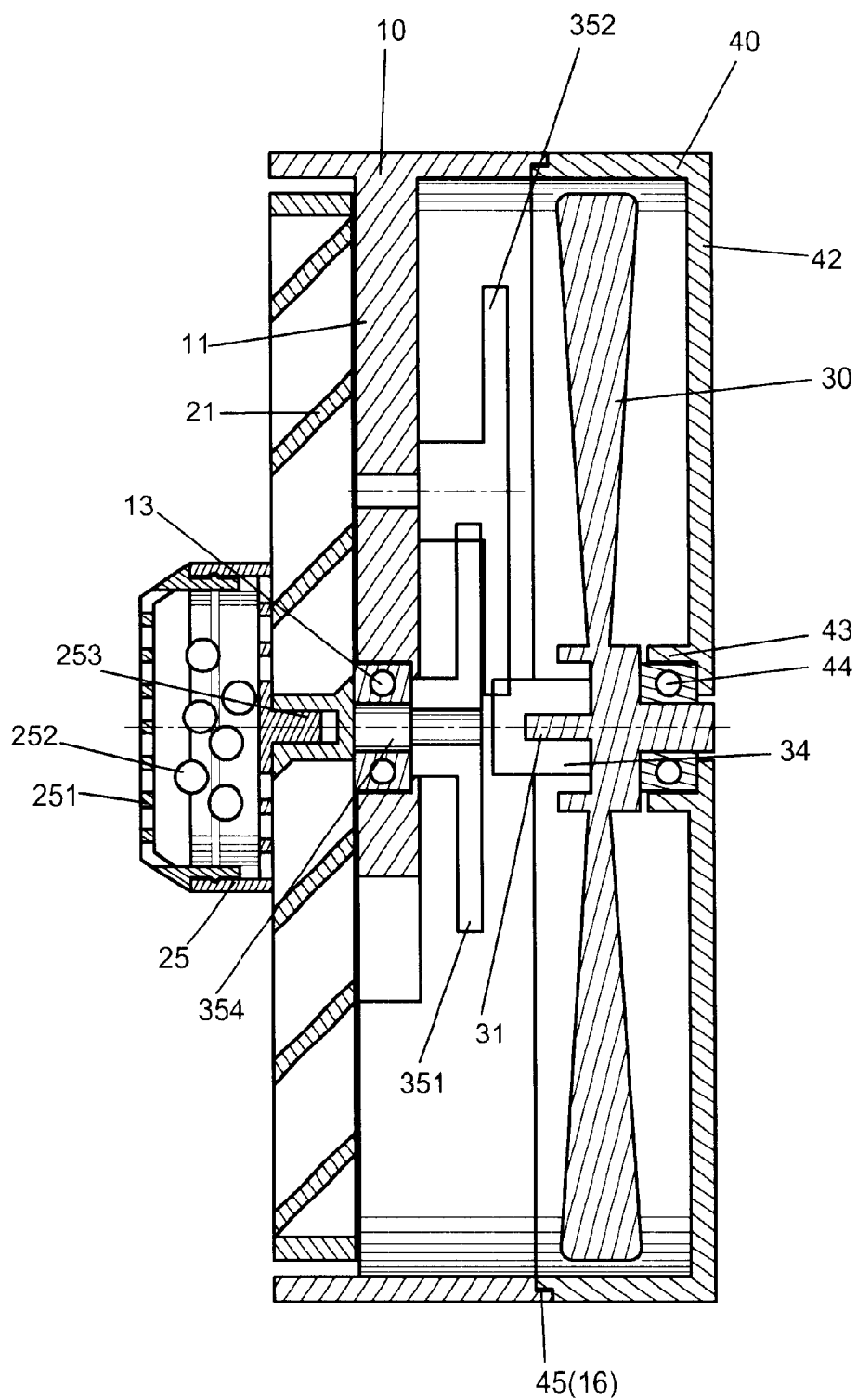
FIG. 2 is a sectional assembly view of the present invention of an automobile air-conditioning outlet deflection device.
Figure 3:
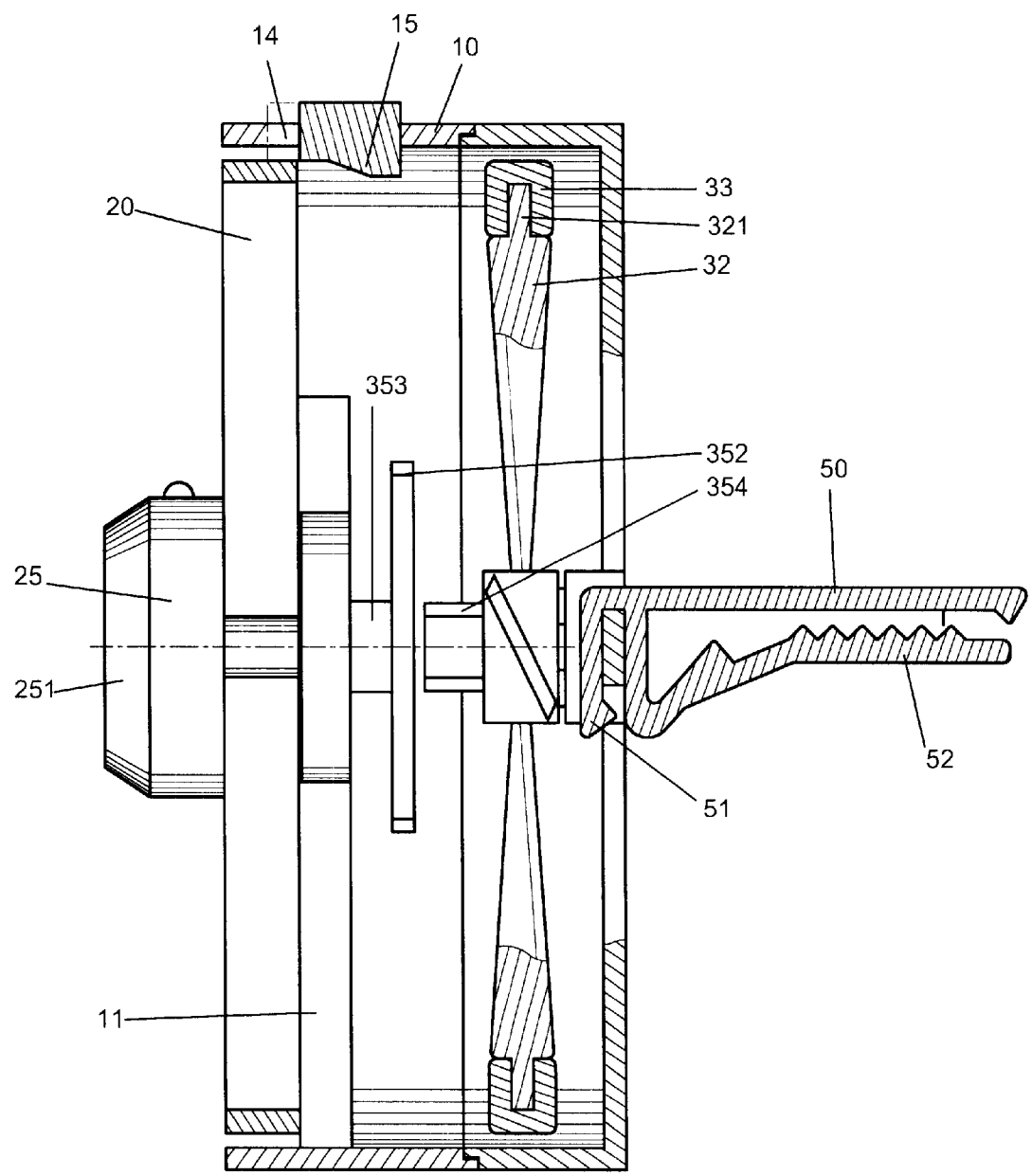
FIG. 3 is a sectional assembly view of the present invention of an automobile air-conditioning outlet deflection device with elements clipper and speed-slowing blade.

The present invention of an automobile air-conditioning outlet deflection device as referring to FIGS. 1, 2 and 3, it mainly comprises a main body 10, a set of deflection blades 20, a set of spinning blades 30, a cover body 40 and a set of gears 35. The main body 10 is in ring shape with a set of posts 11, a center hole 12 of the main body 10 having a bearing 13 inserted inside. The bearing 13 is for an axial rod 354 of the set of gears 35 to go through and reaches the center of the deflection blades 20. The outer ring of the main body 10 having a sliding hole 14, a stopping piece 15 is inserted inside the sliding hole 14. The stopping piece 15 having one side thicker and the other side thinner for inserting between the main body 10 and the deflection blades 20. A sliding button 151 is disposed on top of the stopping piece 15 for sliding the stopping piece 15. The deflection blades 20 having a set of blades 21 each inclining to the same direction. A hole 24 is disposed at the center of the deflection blades 20 for inserting a central rod 253 of a perfume case 25. Perfume balls 252 are placed inside the perfume case 25 with a lid 251 to cover it. The deflection blades 20 having a ring circumference 22 to provide contact surface for the stopping piece 15 to press against, so that the deflection blades 20 can either in spinning motion or in still. The set of gears 35 comprises a big gear 351 and a small gear 352. An axial gear 34 located at the center of the spinning blades 30 is connected to the small gear 352. A gear rod 353 disposed at the center of the small gear 352 is connected to the big gear 351. An Axial rod 354 is disposed at the center of the big gear 351 which go through the main body 10 and is connected to the deflection blades 20.

The spinning blades 30 comprises a plurality of long and short blades 32. An axial rod 31 is disposed at the center of the spinning blades 30 for inserting into an axial gear 34. On top of four of the short blades 32 having a fixing rode 321 each for connecting to a speed-slowing blade 33. The speed-slowing blade 33 having a head 331 and a top piece 332. A hole 3311 is disposed on the head 331 for the fixing rode 321 to insert into. The connection part between the top piece 332 and the head 331 is relatively thinner for the purpose of extending the top piece 332 to press against an inner circumference side 41 of the cover body 40. The rubbing between the spinning blades 30 and the inner circumference side 41 thus can slow down the spinning speed and provide a steady spinning motion despite the blowing intensity of the air-conditioning. A plurality of crossing rods 42 is disposed within the cover body 40 with their ends connecting to the inner circumference side 41. An axial ring 43 is located at the center of the cover body 40 and the intersection point of the crossing rods 42 for inserting a bearing 44. The bearing 44 is for inserting the axial rod 31 of the spinning blades 30. One of the crossing rods 42 of the cover body 40 provides surface for a clipper 50 to clip on. The clipper 50 having a hook part 51 and a clip part 52, the hook part 51 can be forced apart to hook on the crossing rod 42. The clip part 52 can clip on blades of air-conditioning outlet of automobile. The circumference side 41 of the cover body 40 having an assembly ring pattern 45 for connecting to an assembly ring pattern 16 of the main body 10.

Accordingly, the present invention of an automobile air-conditioning outlet deflection device can be placed on air-conditioning outlet of automobile, the air blows on the spinning blades 30 and it moves the deflection blades 20 to spin at a speed slower than the one of the spinning blades 30. When the spinning blades 30 spin, the mechanism of the set of gears 35 slow down the spinning speed of the deflection blades 20. Thus air can circulate to different directions evenly. The perfume balls 252 inside the perfume case 25 provides fragrance throughout the automobile.

Figure 4:
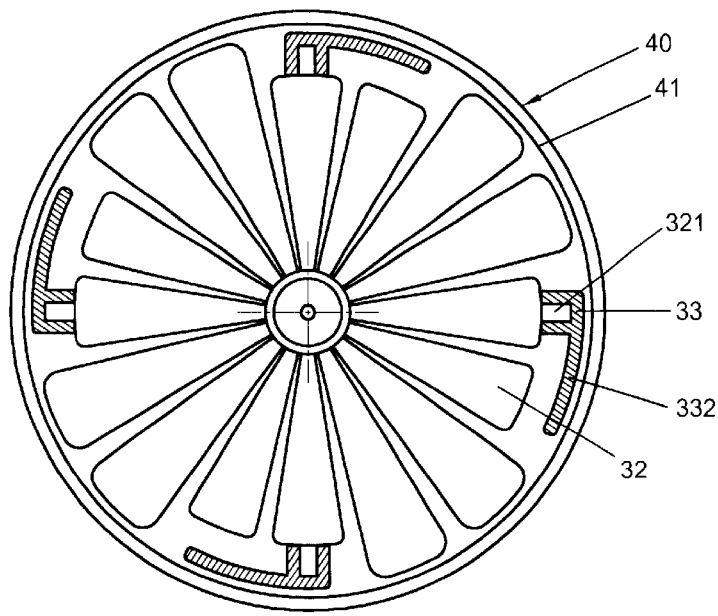
FIG. 4 is a flat view of spinning blades of the present invention of an automobile air-conditioning outlet deflection device.
Figure 5:
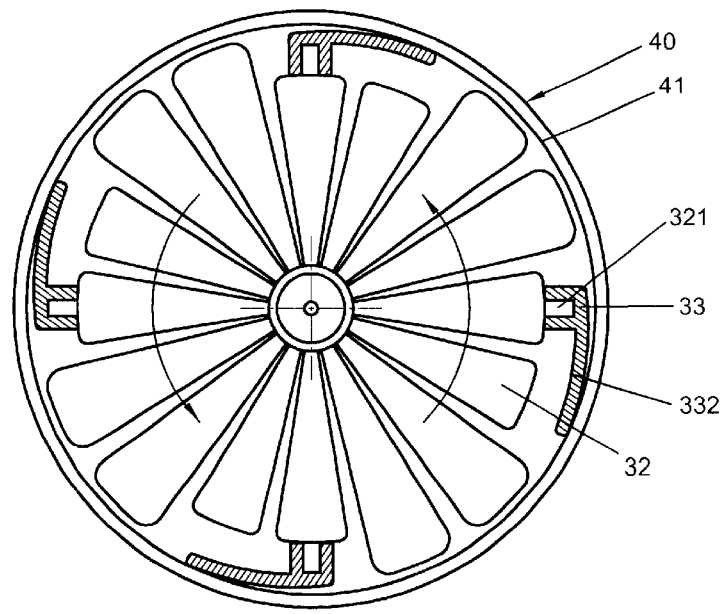
FIG. 5 is a flat view of spinning blades of the present invention of an automobile air-conditioning outlet deflection device when speed-slowing blades are pressed against the cover body.
Figure 6:
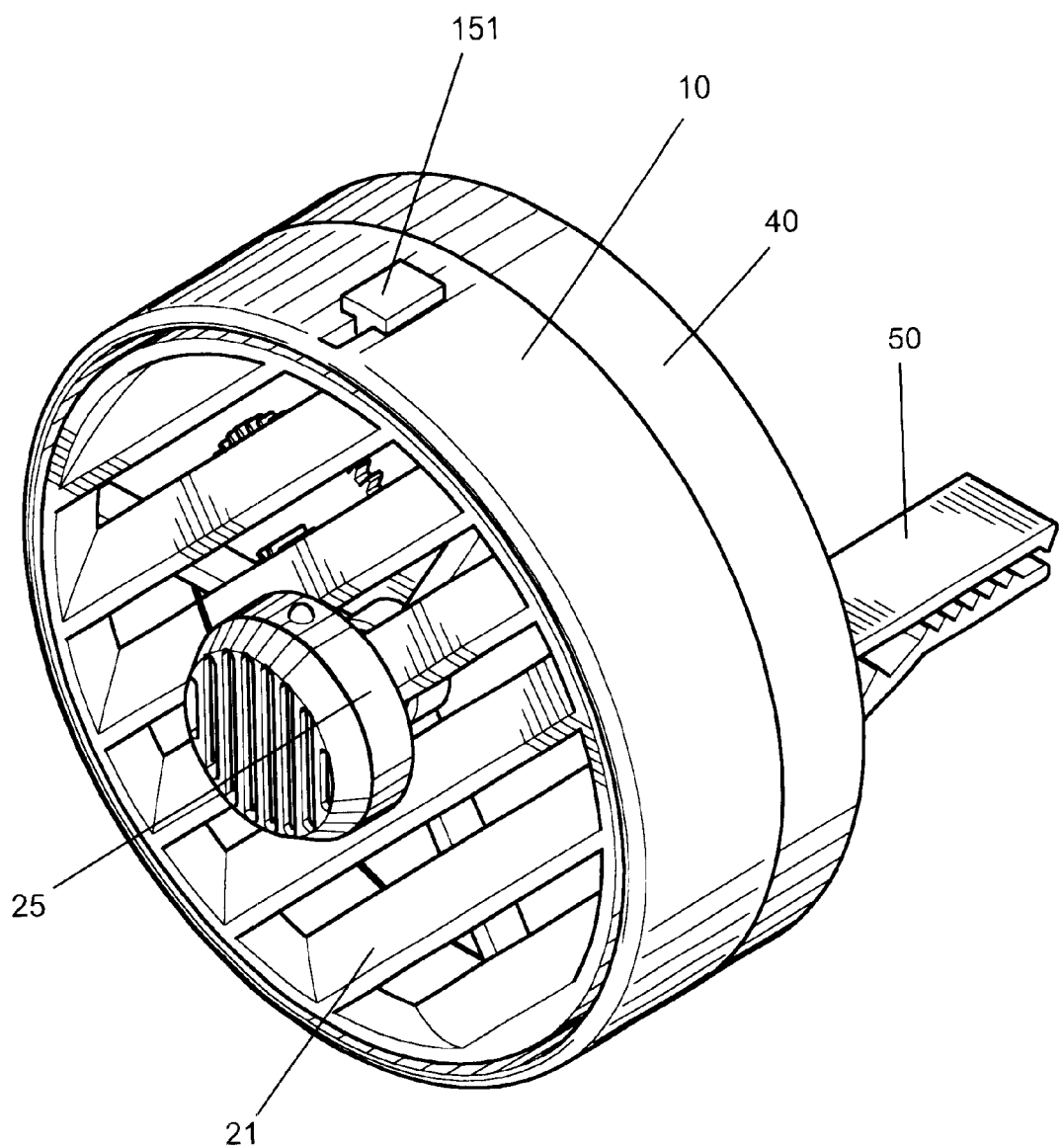
FIG. 6 is a perspective assembly view of the present invention of an automobile air-conditioning outlet deflection device.

Referring to FIGS. 4, 5 and 6, when air-conditioning is adjusted to low intensity, the spinning blades 30 also spin at slow speed and moves the deflection blades 20 to spin at slow speed steadily. If the intensity of the air-conditioning is adjusted higher, the spinning blades 30 also spin at high speed. The speed can be controlled evenly and steadily because the top piece 332 of the speed-slowing blades 33 of the spinning blades 30 extending to press against the inner circumference side 41 of the cover body 40. The rubbing between the top piece 332 and the inner circumference side 41 can slow down the spinning speed of the spinning blades 30 evenly and steadily. Thus the deflection blades 20 also spin at steady and even speed to exhaust the air to the automobile evenly.

If users want to stop the spinning motion of the deflection blades 20, there is no need to take off the present invention, simply slide the sliding button 151 to slide the stopping piece 15 to stop the deflection blades 20 from moving. Thus air-conditioning can blow at a single direction. As referring to FIG. 6, the present invention is compact in size, portable and does not need electricity to run. It is more practical and functional than conventional air dispensers.

The specification relating to the above embodiment should be construed as exemplary rather than as limitative of the present invention, with many variations and modifications being readily attainable by a person of average skill in the art without departing from the spirit or scope thereof as defined by the appended claims and their legal equivalents.

I claim:

1. An automobile air-conditioning outlet deflection device comprising:
a main body which is in ring shape with a plurality of crossing rods, a set deflection blades is connected at the center of the intersection point of said crossing rods, the set of deflection blades comprises a plurality of blades inclining to the same direction, so that air-conditioning exhausted from outlet of automobile changes blowing direction as the said set of deflection blades spins, a set of spinning blades disposed at the other side of said main body, said set of spinning blades spins as air-conditioning blows on it and thus moves said set of deflection blades to spin also, an axial rod is disposed at the center of said set of spinning blades which is connected to a set of gears disposed at the intersection point of said crossing rods, few blades of said set of spinning blades are relatively shorter than the rest, a speed-slowing blade is connected on top of each short blades of said set of spinning blades, said axial rod of said set of spinning blades is connected to a cover body, said cover body having a circumference side and a plurality of crossing rods, when said set of spinning blades spin so fast that said speed-slowing blades are pressed against said circumference side of said cover body, the rubbing effect causes said set of spinning blades to maintain a stable and steadily spinning motion.

2. An automobile air-conditioning outlet deflection device as claimed in claim 1, said speed-slowing blades are roughly in L-shape, one end is a head with a hole which is for a fixing rod of said spinning blade to insert inside, a top piece is extended from said head, thus when said set of spinning blades spins so fast that said top piece presses against said circumference side of said cover body.

3. An automobile air-conditioning outlet deflection device as claimed in claim 1, an axial ring is disposed at the center of said cover body for inserting a bearing, said bearing is connected to said axial rod of said set of spinning blades.

4. An automobile air-conditioning outlet deflection device as claimed in claim 1, said axial rod of said set of spinning blades is connected to an axial gear, said axial gear is connected to said set of gears which comprises a big and a small gear, said small gear having a gear rod connected to said big gear, an axial rod of said big gear go through the center of said main body and is connected to the center of said set of deflection blades, the center of said main body having a bearing.

5. An automobile air-conditioning outlet deflection device as claimed in claim 1, a sliding hole is disposed on the ring circumference of said main body, a stopping piece with a sliding button on its top is inserted into said sliding hole, said stopping piece can be inserted inside between said main body and said set of deflection blades.

6. An automobile air-conditioning outlet deflection device as claimed in claim 1, a hole is disposed at the center of said deflection blades for inserting a central rod of a fragrance case.

* * * * *